US010168081B2

(12) United States Patent
Hirota et al.

(10) Patent No.: US 10,168,081 B2
(45) Date of Patent: Jan. 1, 2019

(54) ADSORPTION HEAT PUMP SYSTEM AND COOLING GENERATION METHOD

(71) Applicant: KABUSHIKI KAISHA TOYOTA CHUO KENKYUSHO, Nagakute-shi, Aichi-ken (JP)

(72) Inventors: Yasuki Hirota, Nagakute (JP); Takafumi Yamauchi, Nagakute (JP); Ryuichi Iwata, Nagakute (JP); Takashi Shimazu, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 128 days.

(21) Appl. No.: 14/625,905

(22) Filed: Feb. 19, 2015

(65) Prior Publication Data

US 2015/0377525 A1    Dec. 31, 2015

(30) Foreign Application Priority Data

Jun. 30, 2014    (JP) .................................. 2014-135086

(51) Int. Cl.
 *F25B 17/08*    (2006.01)
 *F25B 30/04*    (2006.01)
(52) U.S. Cl.
 CPC ............ *F25B 17/08* (2013.01); *F25B 17/083* (2013.01); *F25B 30/04* (2013.01); *Y02A 30/277* (2018.01); *Y02A 30/278* (2018.01); *Y02B 30/62* (2013.01); *Y02B 30/64* (2013.01)
(58) Field of Classification Search
 CPC ........ F25B 17/08; F25B 17/083; F25B 30/04; Y02B 30/64
 See application file for complete search history.

(56) References Cited

U.S. PATENT DOCUMENTS

| 4,333,515 | A | | 6/1982 | Wilkinson et al. |
|---|---|---|---|---|
| 5,505,059 | A | * | 4/1996 | Sanborn ................ F25B 17/083 62/324.4 |
| 5,619,866 | A | | 4/1997 | Sato et al. |
| 5,619,886 | A | | 4/1997 | Hishino |
| 5,628,205 | A | * | 5/1997 | Rockenfeller ......... C09K 5/047 62/480 |
| 5,775,126 | A | | 7/1998 | Sato et al. |
| 6,625,388 | B2 | | 9/2003 | Winter et al. |

(Continued)

FOREIGN PATENT DOCUMENTS

| JP | H05248727 A | 9/1993 |
|---|---|---|
| JP | H08240357 A | 9/1996 |

(Continued)

OTHER PUBLICATIONS

Nov. 23, 2015 Extended Search Report issued in European Patent Application No. 15156939.9.

(Continued)

*Primary Examiner* — Filip Zec
(74) *Attorney, Agent, or Firm* — Oliff PLC (57) ABSTRACT

An adsorption heat pump system comprises an evaporator that evaporates an adsorbate; a first adsorption device that adsorbs the adsorbate of the evaporator and generates cooling in the evaporator; and a second adsorption device that adsorbs the adsorbate that was adsorbed by the first adsorption device and generates cooling in the first adsorption device.

9 Claims, 10 Drawing Sheets

(56) References Cited

U.S. PATENT DOCUMENTS

| | | | | |
|---|---|---|---|---|
| 7,810,342 | B2* | 10/2010 | Matsui | B01D 53/261 |
| | | | | 62/160 |
| 7,997,098 | B2* | 8/2011 | Yabu | B01D 53/261 |
| | | | | 252/69 |
| 2010/0058804 | A1 | 3/2010 | Monereau et al. | |
| 2010/0300124 | A1* | 12/2010 | Braunschweig | F25B 17/083 |
| | | | | 62/101 |
| 2011/0283736 | A1 | 11/2011 | Manabe et al. | |
| 2012/0264600 | A1 | 10/2012 | Tso et al. | |
| 2013/0276475 | A1 | 10/2013 | Aso et al. | |
| 2014/0053577 | A1 | 2/2014 | Hirota et al. | |
| 2015/0159923 | A1 | 6/2015 | Akisawa et al. | |

FOREIGN PATENT DOCUMENTS

| | | |
|---|---|---|
| JP | H09303900 A | 11/1997 |
| JP | H10-332218 A | 12/1998 |
| JP | 2000-130877 A | 5/2000 |
| JP | 2001-141327 A | 5/2001 |
| JP | 2005029460 A | 2/2005 |
| JP | 2005-214552 A | 8/2005 |
| JP | 2006-300414 A | 11/2006 |
| JP | 2010-151386 A | 7/2010 |
| JP | 2014-040959 A | 3/2014 |
| WO | 2014003013 A1 | 1/2014 |

OTHER PUBLICATIONS

Jun. 14, 2016 Office Action issued in Japanese Patent Application No. 2014-135086.

Nov. 17, 2017 Office Action issued in U.S. Appl. No. 14/625,938.

Machine translation of JP 2006-300414, Inaoka et al., Nov. 2, 2006, PAJ, all.

Mar. 1, 2016 Office Action issued in Japanese Patent Application No. 2014-060600.

* cited by examiner

ADSORPTION HEAT PUMP SYSTEM AND COOLING GENERATION METHOD

CROSS-REFERENCE TO RELATED APPLICATION

This application is based on and claims priority under 35 USC 119 from Japanese Patent Application No. 2014-135086 filed on Jun. 30, 2014; the disclosure of which is incorporated by reference herein.

BACKGROUND

Technical Field

The present invention relates to an adsorption heat pump system and a cooling generation method.

Related Art

Japanese Patent Application Laid-Open (JP-A) No. 2014-40959 describes, as an adsorption heat pump, a configuration provided with an evaporator, an adsorption device, and a heat storage reactor, in which the heat storage reactor stores heat, heat is radiated toward the adsorption device in an amount of a latent heat of evaporation of a heating medium or greater, and the adsorption device is regenerated by heating action to a regeneration temperature or greater.

SUMMARY

In consideration of the above circumstances, an object of the present invention is to perform efficient cooling generation.

According to a first aspect of the invention, there is provided an adsorption heat pump system comprising an evaporator that evaporates an adsorbate; a first adsorption device that adsorbs the adsorbate of the evaporator and generates cooling in the evaporator; and a second adsorption device that adsorbs the adsorbate that was adsorbed by the first adsorption device and generates cooling in the first adsorption device.

In the adsorption heat pump system, the adsorbate of the evaporator is adsorbed by the first adsorption device. Namely, the adsorbate is evaporated by the evaporator, and cooling is generated.

Adsorbate that was adsorbed by the first adsorption device is adsorbed by the second adsorption device. Namely, pressure in the first adsorption device drops. The adsorbate in the first adsorption device evaporates, and a portion of the adsorbent of the first adsorption device is regenerated. Further cooling is generated in the first adsorption device, and the evaporated adsorbate is adsorbed by the second adsorption device.

Namely, in the adsorption heat pump system, cooling can be generated using the desorption energy when adsorbate is desorbed during regeneration of the first adsorption device. Efficient cooling generation can thereby be performed, compared to a configuration in which the desorption energy is not used for cooling generation.

According to a second aspect of the present invention, in the first aspect of the adsorption heat pump system, a combination of adsorbents of the first adsorption device and the second adsorption device may be a combination such that, with respect to a first equilibrium pressure after the adsorbate has been desorbed by the first adsorption device, a second equilibrium pressure after the desorbed adsorbate has been absorbed by the second adsorption device is the first equilibrium pressure or lower.

This enables the operation in which adsorbate that was desorbed by the first adsorption device is adsorbed by the second adsorption device to be reliably performed.

According to a third aspect of the present invention, in the first aspect or the second aspect of the adsorption heat pump system, an adsorption capacity of the second adsorption device may be greater than an adsorption capacity of the first adsorption device.

When the adsorption capacity of the second adsorption device is greater than the adsorption capacity of the first adsorption device, adsorbate of the first adsorption device can be reliably (preferably an amount that is close to the full adsorbed amount) adsorbed by the second adsorption device.

According to a fourth aspect of the present invention, in any one of the first aspect to the third aspect of the adsorption heat pump system, the adsorbate may be water or ammonia.

Namely, by using water or ammonia, that are highly versatile, as the adsorbate, the adsorption heat pump system can be configured at low cost.

According to a fifth aspect of the present invention, in any one of the first aspect to fourth aspect of the adsorption heat pump system, the evaporator also may function as a condenser that condenses the introduced gaseous adsorbate; and the adsorption heat pump system may further include a bypass pipe that bypasses a plurality of the first adsorption devices and connects the evaporator and the second adsorption device together.

By connecting the second adsorption device and the evaporator using the bypass pipe that bypasses the first adsorption device, adsorbate desorbed by the second adsorption device can be moved to the evaporator, and regeneration of the second adsorption device can be easily performed.

According to a sixth aspect of the present invention, in any one of the first aspect to fifth aspect of the adsorption heat pump system, may further comprises a plurality of the first adsorption devices that are disposed in a direction parallel to a connection direction of the evaporator and the second adsorption device.

Accordingly, separate processing can be performed due to the plural first adsorption devices being disposed in parallel. For example, adsorbate of the evaporator can be adsorbed in a specific first adsorption device, and adsorbate of the second adsorption device can be adsorbed in another first adsorption device, and can be used in regeneration of the second adsorption device.

According to a seventh aspect of the present invention, in any one of the first aspect to sixth aspect of the adsorption heat pump system, may further comprises a condenser that is provided between the first adsorption device(s) and the second adsorption device and that condenses the adsorbate.

By condensing adsorbate that was desorbed by the second adsorption device using the condenser, regeneration of the second adsorption device can be efficiently performed.

According to an eighth aspect of the present invention, there is provided a cooling generation method using an evaporator that evaporates an adsorbate; a first adsorption device that adsorbs the adsorbate of the evaporator; and a second adsorption device that adsorbs the adsorbate adsorbed by the first adsorption device, the cooling generation method comprises adsorbing the adsorbate of the evaporator at the first adsorption device and cooling in the evaporator, and adsorbing the adsorbate of the first adsorption device at the second adsorption device and cooling in the first adsorption device.

In the cooling generation method, adsorbate of the evaporator is adsorbed by the first adsorption device. Namely, adsorbate is evaporated in the evaporator, and cooling is generated.

Furthermore, the second adsorption device reduces the pressure in the first adsorption device. Adsorbate is evaporated in the first adsorption device, and a portion of the adsorbent of the first adsorption device is regenerated. Further cooling is generated in the first adsorption device, and the evaporated adsorbate is adsorbed by the second adsorption device.

In this way, the desorption energy when adsorbate is desorbed during regeneration of the first adsorption device can be used by the second adsorption device, and cooling can be generated. Efficient cooling generation can accordingly be performed, compared to a configuration in which desorption energy is not employed for cooling generation.

According to a ninth aspect of the present invention, in the eighth aspect of the adsorption heat pump system, the evaporator also may function as a condenser which condenses the introduced gaseous adsorbate; and the adsorbate of the second adsorption device may be adsorbed by the first adsorption device, or condensed in the evaporator, during regeneration of the second adsorption device.

Namely, since the first adsorption device or the evaporator is employed for regeneration of the second adsorption device, the second adsorption device can be efficiently regenerated.

Due to the above configuration, the present invention enables cooling generation to be efficiently performed.

BRIEF DESCRIPTION OF THE DRAWINGS

Exemplary embodiments of the present invention will be described in detail based on the following figures, wherein.

DETAILED DESCRIPTION

Figure 1:
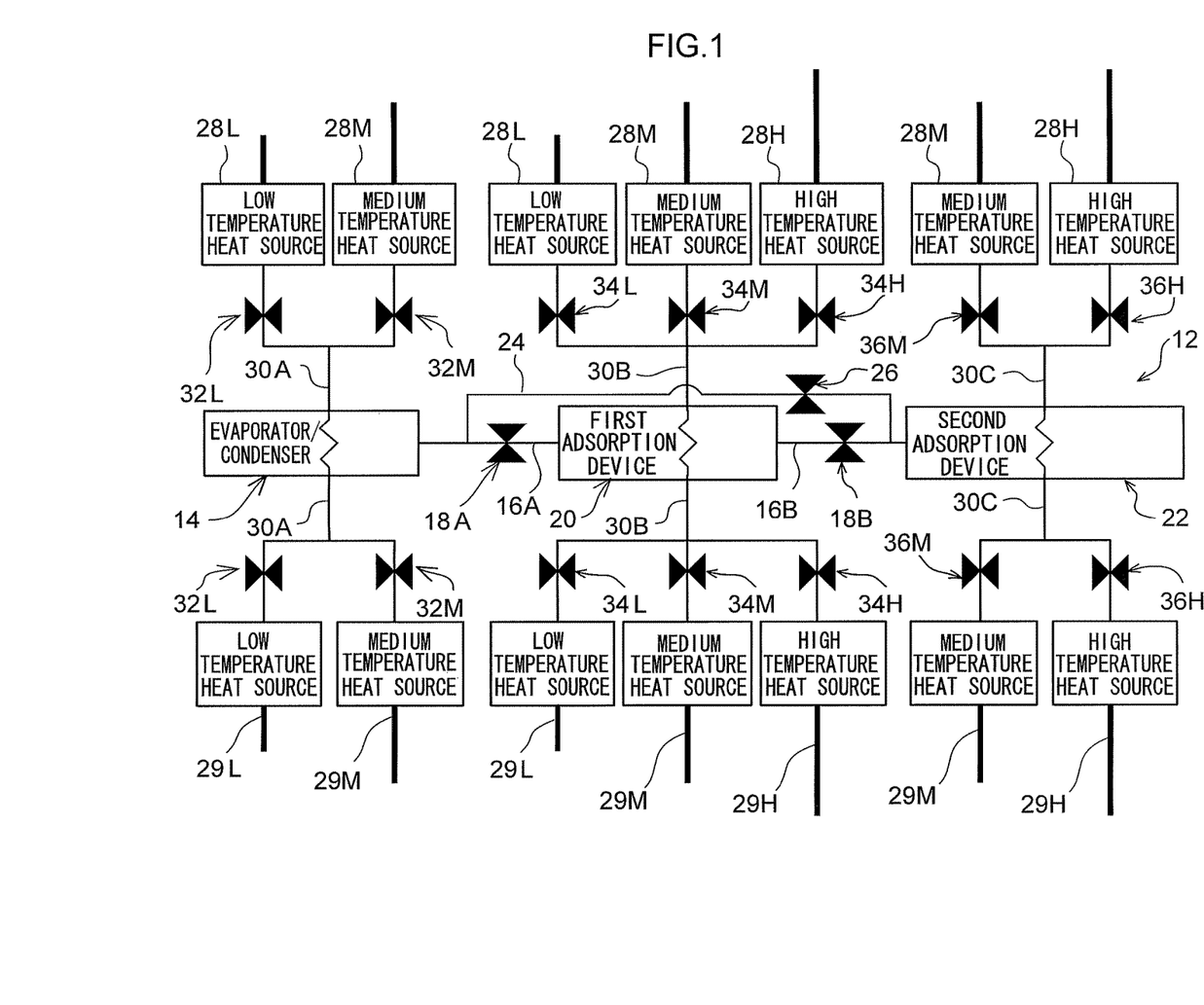
FIG. 1 is a schematic view illustrating a configuration of an adsorption heat pump system of a first exemplary embodiment of the present invention.

FIG. 1 illustrates an adsorption heat pump system (abbreviated to "heat pump" below) 12 of a first exemplary embodiment of the present invention.

The heat pump 12 includes an evaporator/condenser 14, a first adsorption device 20, and a second adsorption device 22. In the present exemplary embodiment, the evaporator/condenser 14 functions as an evaporator, and functions as a condenser. Namely, when energy (high temperature) acts on adsorbate of liquid inside the evaporator/condenser 14, the adsorbate evaporates, and cooling is generated. Further the adsorbate is condensed when energy is taken from the adsorbate gas flowing in from outside the evaporator/condenser 14.

The first adsorption device 20 and the second adsorption device 22 each contain a different type of adsorbent. The material chosen for the adsorbent of the second adsorption device 22 desorbs the adsorbate with heat at a higher regeneration temperature than the adsorbent of the first adsorption device 20.

In the present exemplary embodiment, the adsorbent of the first adsorption device 20 is, for example, AQSOA-Z05 (AQSOA is a registered trademark belonging to Mitsubishi Plastics, Inc.), and the adsorbent of the second adsorption device 22 is, for example, a Y zeolite. Further water or ammonia, for example, may be employed as the adsorbate. Water and ammonia are adsorbed and desorbed by the adsorbent under the required conditions (temperature and pressure) in the heat pump 12, and can be procured at low cost.

The evaporator/condenser 14, the first adsorption device 20, and the second adsorption device 22 are connected together in series in this sequence by connecting pipes 16A, 16B.

An opening/closing valve 18A is provided to the connecting pipe 16A. Adsorbate is able to move between the first adsorption device 20 and the evaporator/condenser 14 when the opening/closing valve 18A is open. An opening/closing valve 18B is provided to the connecting pipe 16B. Adsorbate is able to move between the second adsorption device 22 and the first adsorption device 20 when the opening/closing valve 18B is open.

The evaporator/condenser 14 and the second adsorption device 22 are connected by a bypass pipe 24 that bypasses the first adsorption device 20. A bypass valve 26 is provided to the bypass pipe 24. When the bypass valve 26 is open, adsorbate is able to move directly from the second adsorption device 22 to the evaporator/condenser 14, without going through the first adsorption device 20.

Connecting pipes 30A, connected to two heat sources (a low temperature heat source 28L and a medium temperature heat source 28M), are provided to the evaporator/condenser 14. Each connecting pipe 30A branches toward each of the heat sources at the heat source-side, and opening/closing valves 32L, 32M are provided on the respective branch portions. When the opening/closing valves 32L, 32M are open, a heat exchange medium flows from the heat sources to the evaporator/condenser 14, undergoes heat exchange in the evaporator/condenser 14, and returns to the heat sources.

Connecting pipes 30B that are each connected to three heat sources (a low temperature heat source 28L, a medium temperature heat source 28M, and a high temperature heat source 28H) are provided to the first adsorption device 20. Each connecting pipe 30B branches toward each of the heat sources at the heat source-side, and opening/closing valves 34L, 34M, 34H are provided on the respective branch portions. When the opening/closing valves 34L, 34M, 34H are open, a heat exchange medium flows from the heat sources to the first adsorption device 20, undergoes heat exchange in the first adsorption device 20, and returns to the heat sources.

Connecting pipes 30C that are connected to two heat sources (a medium temperature heat source 28M and a high temperature heat source 28H) are provided to the second adsorption device 22. Each connecting pipe 30C branches toward each of the heat sources at the heat source-side, and opening/closing valves 36M, 36H are provided on the respective branch portions. When the opening/closing valves 36M, 36H are open, a heat exchange medium flows from the heat sources to the second adsorption device 22, undergoes heat exchange in the second adsorption device 22, and returns to the heat sources.

Although there are no particular limitations to specific examples of the low temperature heat source 28L, the medium temperature heat source 28M and the high temperature heat source 28H, the medium temperature heat source 28M has a higher temperature than the low temperature heat source 28L, and the high temperature heat source 28H has a higher temperature than the medium temperature heat source 28M. For example, as the low temperature heat source 28L, the heat source of a refrigerant circulating in pipeline 29L may be used to cool a cooling target (to obtain cooling). As the medium temperature heat source 28M, the heat source of a heat exchange medium flowing in pipeline 29M may be used to exchange heat with the outside at the outside (exterior) of a cooling target. The high temperature heat source 28H may be the heat source of a heat exchange medium flowing in pipeline 29H to regenerate the heat pump 12.

Next, explanation follows regarding a method of generating cooling using the heat pump 12 of the present exemplary embodiment, and operation of the heat pump 12 of the present exemplary embodiment. In the below explanation, opening/closing valves are closed, other than those clearly stated to be in an open state.

As described in detail below, a cooling generation process and a regeneration process are performed alternately to generate cooling using the heat pump 12. When a specific example is mentioned below, the example referred to is that described above, in which AQSOA-Z05 is employed as the adsorbent of the first adsorption device 20, and a Y zeolite is employed as the adsorbent of the second adsorption device 22.

Cooling Generation Process

Cooling Generation Step 1

Figure 3:
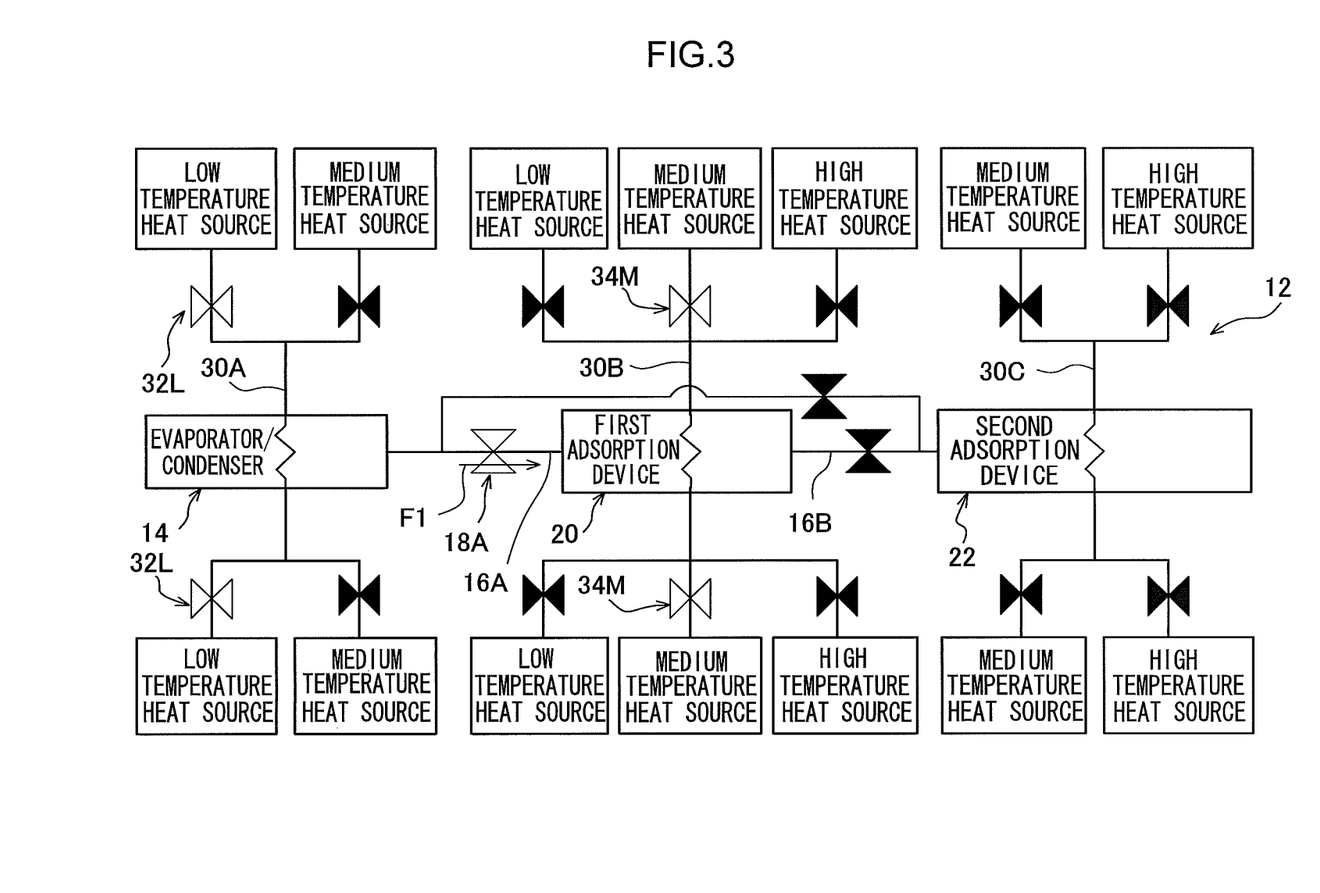
FIG. 3 is an explanatory drawing illustrating an adsorption heat pump system according to the first exemplary embodiment of the present invention in a cooling generation state.

Cooling generation step 1 is performed in the cooling generation process. As illustrated in FIG. 3, at cooling generation step 1, the opening/closing valves 32L are opened, and heat exchange medium is able to move from the low temperature heat sources 28L to the evaporator/condenser 14. The opening/closing valves 34M are also opened, and heat exchange medium is able to move from the medium temperature heat sources 28M to the first adsorption device 20. The opening/closing valve 18A is also opened.

By this way, when this occurs, adsorbate evaporates in the evaporator/condenser 14, and, as illustrated by the arrow F1 in FIG. 3, the adsorbate is adsorbed by the first adsorption device 20.

Assuming that a temperature T1 (the desired cooling temperature) to be achieved by the low temperature heat sources 28L is 15° C., and a temperature T2 (the external ambient temperature) of the medium temperature heat sources 28M is 30° C. In such case, a relative pressure $\phi 2$ of the first adsorption device 20 is $\phi 2 = P1/P2$, wherein P1 is the saturated vapor pressure of the evaporator/condenser 14 at the temperature T1, and P2 is the saturated vapor pressure of the first adsorption device 20 at the temperature T2. When P1=1.5 kPa and P2 =4.3 kPa, $\phi 2 \approx 0.348$.

Figure 2:
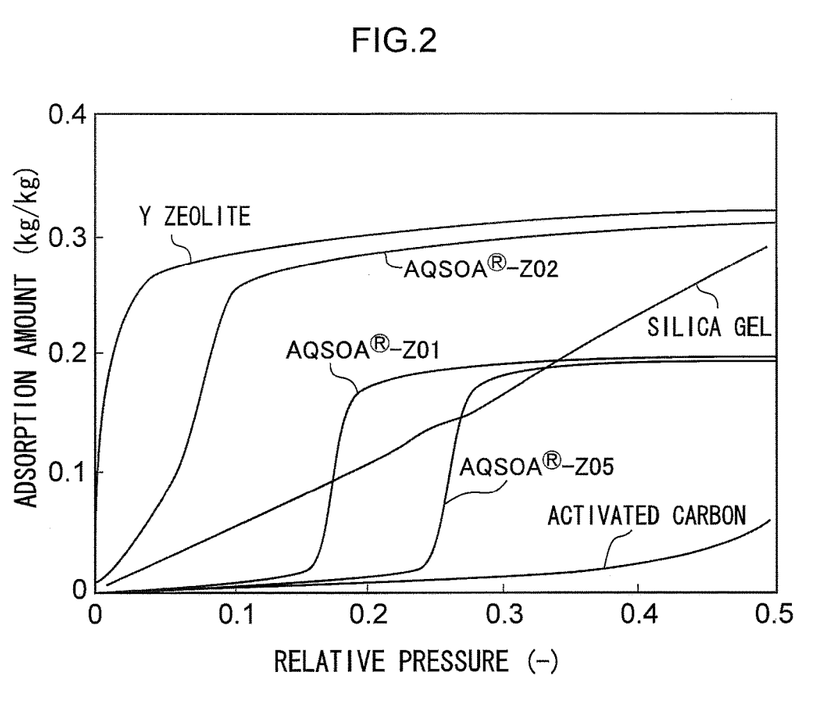
FIG. 2 is a graph illustrating adsorption isotherms of various adsorbents.

FIG. 2 illustrates a relationship between relative pressure and adsorption amount for examples of various adsorbents that may be employed in the first adsorption device 20 or the second adsorption device 22. FIG. 2 shows that, with a relative pressure $\phi 2$ of 0.348, the AQSOA-Z05, an adsorbent of the first adsorption device 20, is able to adsorb substantially the entire adsorbable amount. A low temperature of 15° C. can therefore be generated by the first adsorption device 20 adsorbing adsorbate that has evaporated in the evaporator/condenser 14.

Figure 4:
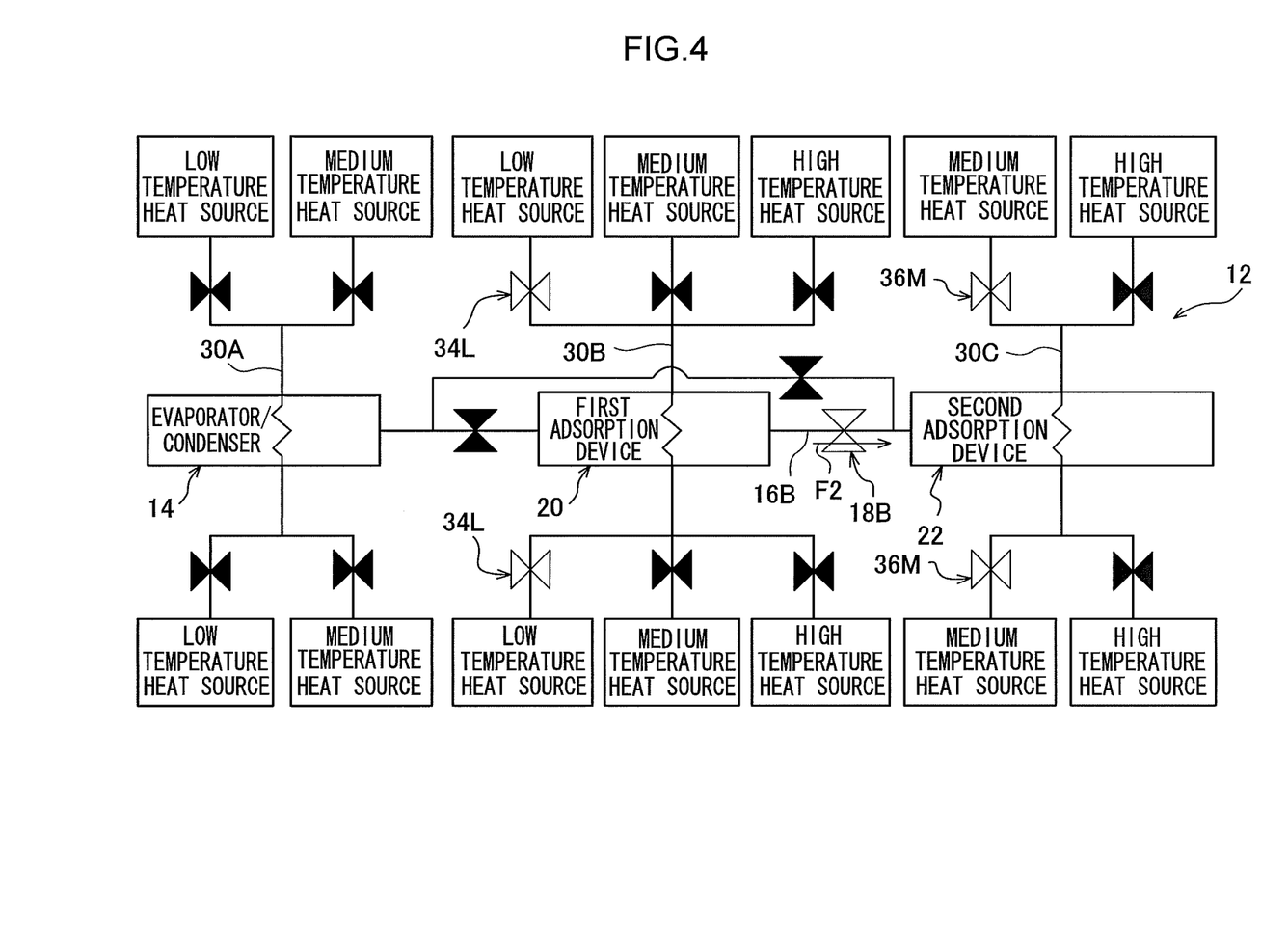
FIG. 4 is an explanatory drawing illustrating an adsorption heat pump system according to the first exemplary embodiment of the present invention in a cooling generation state.

Next, cooling generation step 2 is performed. As illustrated in FIG. 4, at cooling generation step 2, first the opening/closing valves 32L, 34M, 18A are closed.

The opening/closing valves 34L are then opened, and heat exchange medium is able to move from the low temperature heat sources 28L to the first adsorption device 20. The opening/closing valves 36M are also opened, and heat exchange medium is able to move from the medium temperature heat sources 28M to the second adsorption device 22. The opening/closing valve 18B is also opened.

By this way, adsorbate thereby evaporates in the first adsorption device 20, and, as illustrated by the arrow F2 in FIG. 4, the adsorbate is adsorbed in the second adsorption device 22.

Similarly to previously described, assuming that the temperature T1 (the desired cooling temperature) to be achieved by the low temperature heat source 28L is 15° C., and the temperature T2 (the external ambient temperature) of the medium temperature heat source 28M is 30° C. In such case, a relative pressure $\phi 1$ of the first adsorption device 20 is defined as $\phi 1 = P3/P4$, wherein P3 is the equilibrium pressure of the second adsorption device 22 at the temperature T2, and P4 is the saturated vapor pressure of the first adsorption device 20 at the temperature T1. In practice P4≈P1.

On the Y zeolite adsorption isotherm illustrated in FIG. 2, supposing that the Y zeolite is employed until the relative pressure reaches 0.05, the equilibrium pressure P3 at the temperature T2 of the second adsorption device 22 is P3=P2×0.05=4.3 kPa×0.05=0.215 kPa.

As a result, $\phi 1 = 0.143$. The graph in FIG. 2 shows that, with a relative pressure of 0.143, substantially the entire adsorbed amount of AQSOA-Z05, the adsorbent of the first adsorption device 20, can be desorbed, and a low temperature of 15° C. can be generated.

As is shown in the above explanation, at cooling generation step 2, the first adsorption device 20 is regenerated by adsorbate being desorbed from the first adsorption device 20. Moreover, cooling is generated by employing desorption energy when the adsorbate is desorbed during regeneration of the first adsorption device 20.

Regeneration Process

When the cooling generation process is performed, in the second adsorption device 22 the adsorbate is adsorbed, in particular at cooling generation step 2, and so regeneration is performed using the regeneration methods below.

First Regeneration Method

Figure 5:
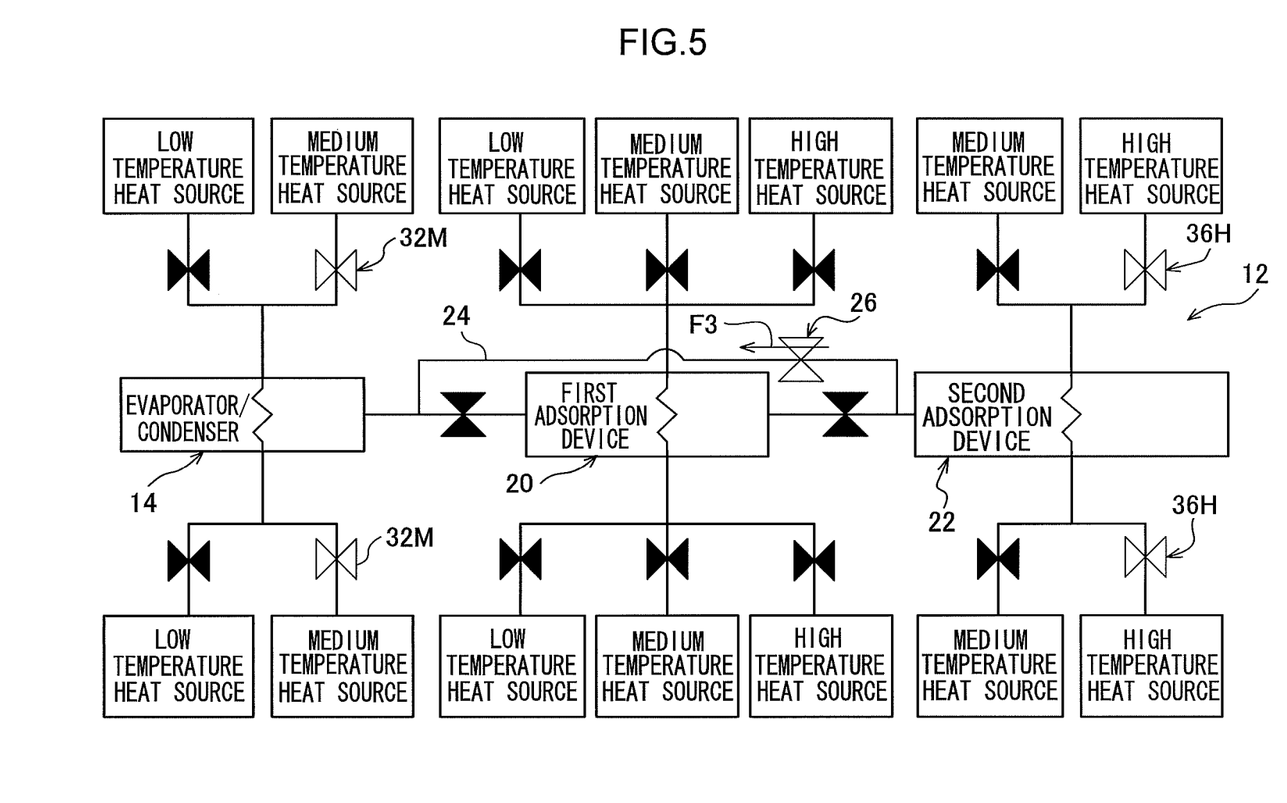
FIG. 5 is an explanatory drawing illustrating an adsorption heat pump system according to the first exemplary embodiment of the present invention in a regeneration state.

A first regeneration method is a regeneration method that does not employ the first adsorption device 20. As illustrated in FIG. 5, in the first regeneration method, the opening/closing valves 32M are opened, and heat exchange medium is able to move from the medium temperature heat sources 28M to the evaporator/condenser 14. The opening/closing valves 36H are also open, and heat exchange medium is able to move from the high temperature heat sources 28H to the second adsorption device 22. The bypass valve 26 is also opened.

Adsorbate in the second adsorption device 22 is thereby desorbed on receipt of heat from the high temperature heat source 28H, and the second adsorption device 22 is regenerated. For example, when the temperature of the high temperature heat source 28H is 200° C., the relative pressure of the second adsorption device 22 is 0.0025. As is shown in the graph in FIG. 2, Y zeolite is sufficiently regenerated at a relative pressure of 0.0025. As illustrated by the arrow F3 in FIG. 5, adsorbate that had been adsorbed by the second adsorption device 22 moves to the evaporator/condenser 14 and is condensed therein.

The first regeneration method is as described above. Note that in the first regeneration method, the opening/closing valves 32L may be opened instead of the opening/closing valves 32M. Moreover, in cases in which the opening/closing valves 32L are opened, depending on the temperatures of the low temperature heat sources 28L and the medium temperature heat sources 28M, the opening/closing valves 36M may be opened instead of the opening/closing valves 36H.

Second Regeneration Method

A second regeneration method is a regeneration method employing the first adsorption device 20, in which regeneration step 1 and regeneration step 2 are performed alternately. Note that when the second regeneration method is performed, the first adsorption device 20 has desorbed the adsorbate and been effectively regenerated in the above cooling generation method, particularly at cooling generation step 2.

Regeneration Step 1

Figure 6:
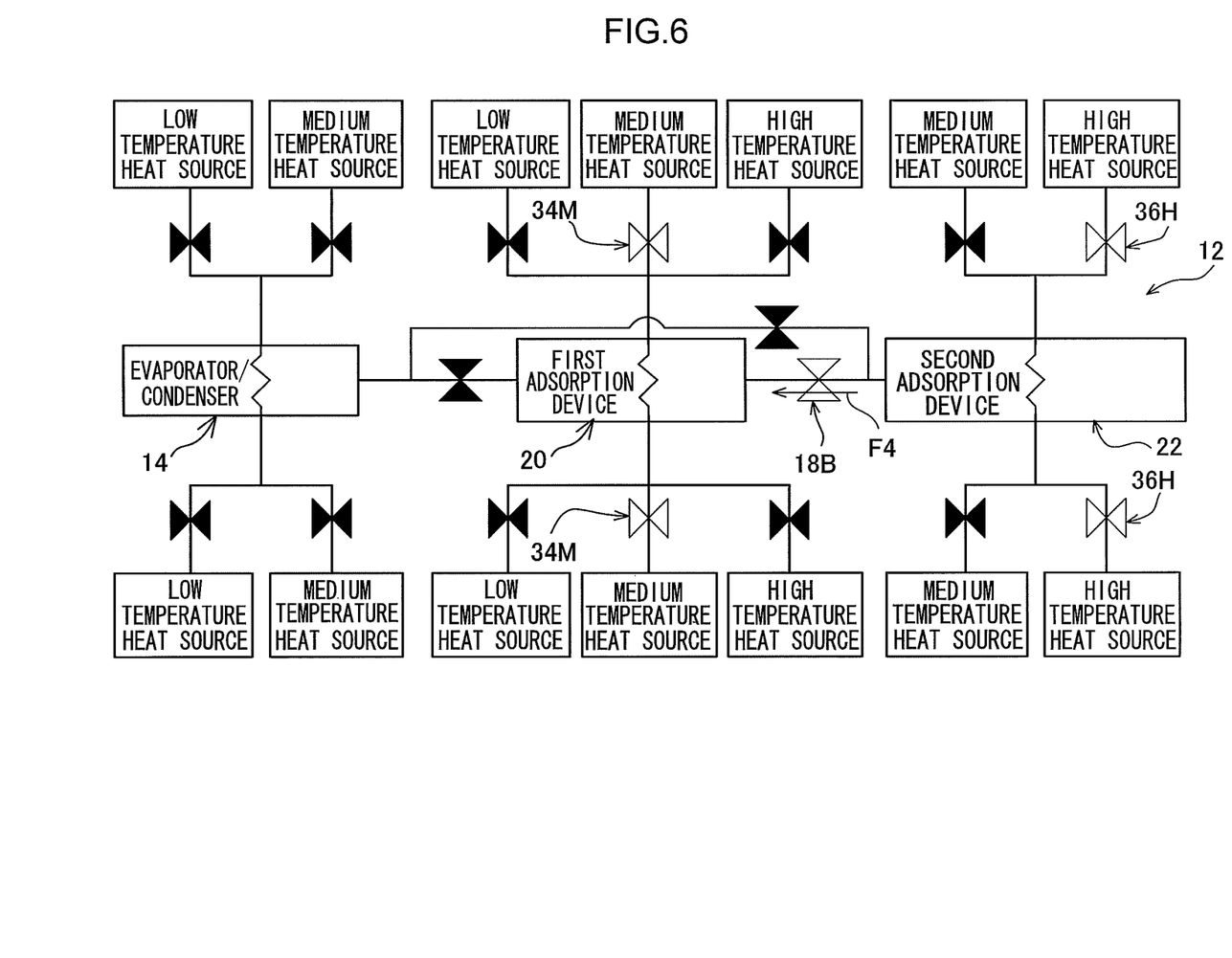
FIG. 6 is an explanatory drawing illustrating an adsorption heat pump system according to the first exemplary embodiment of the present invention in a regeneration state.

As illustrated in FIG. 6, at regeneration step 1, the opening/closing valves 34M are opened, and heat exchange medium is able to move from the medium temperature heat sources 28M to the first adsorption device 20. The opening/closing valves 36H are also opened, and heat exchange medium is able to move from the high temperature heat sources 28H to the second adsorption device 22. The opening/closing valve 18B is also opened.

Adsorbate in the second adsorption device 22 is thereby desorbed on receipt of heat from the high temperature heat sources 28H, and the second adsorption device 22 is regenerated. Similarly to the first regeneration method, when the Y zeolite is regenerated under a relative pressure of up to 0.0025, a temperature of approximately 145° C. for the high temperature heat sources 28H is sufficient. Adsorbate that was adsorbed by the second adsorption device 22 moves to the first adsorption device 20 and is adsorbed therein.

Regeneration Step 2

Figure 7:
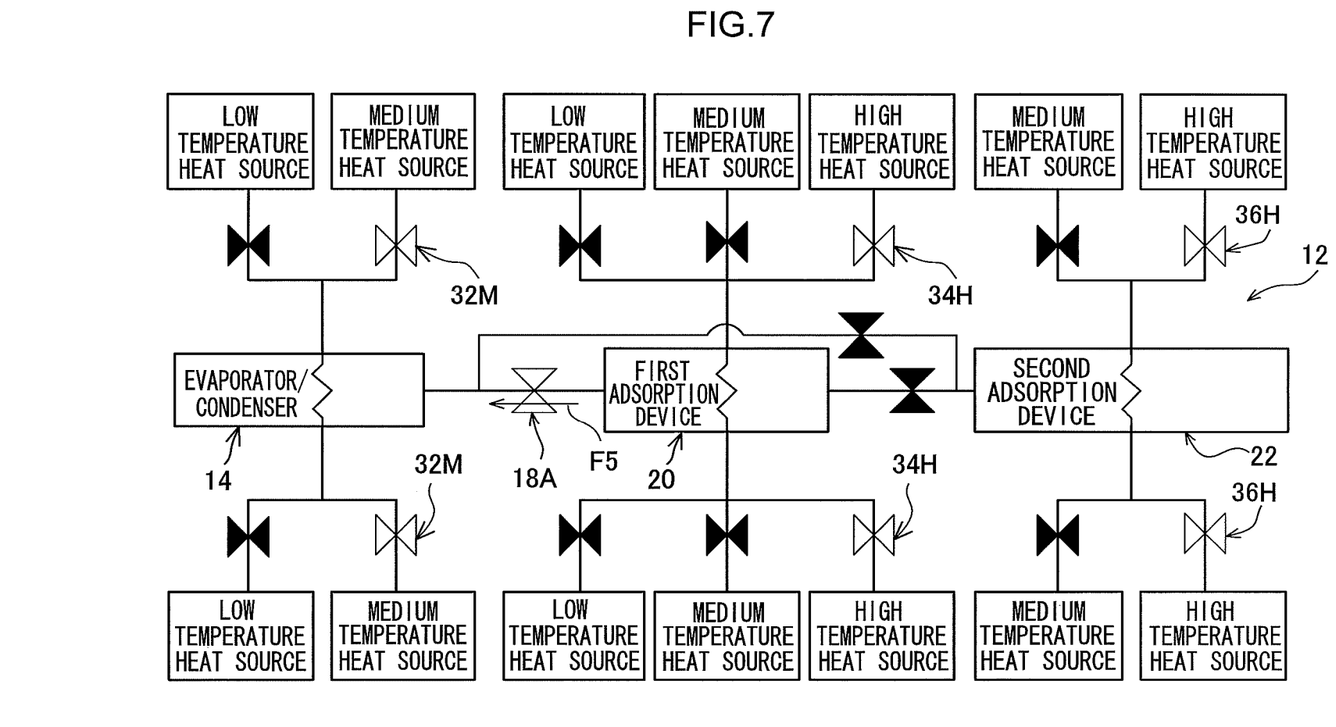
FIG. 7 is an explanatory drawing illustrating an adsorption heat pump system according to the first exemplary embodiment of the present invention in a regeneration state.

Regeneration step 2 is performed when the first adsorption device 20 has reached an adsorption equilibrium (for example, a relative pressure of approximately 0.3). As illustrated in FIG. 7, at regeneration step 2, the opening/closing valves 32M are opened, and heat exchange medium is able to move from the medium temperature heat sources 28M to the evaporator/condenser 14. The opening/closing valves 34H are also opened, and the heat exchange medium is able to move from the high temperature heat sources 28H to the first adsorption device 20. The opening/closing valve 18A is also opened. Note that, although the opening/closing valves 36H are also open in FIG. 7, the opening/closing valves 36H may be closed.

Adsorbate in the first adsorption device 20 is thereby desorbed on receipt of heat from the high temperature heat sources 28H, and the first adsorption device 20 is regenerated. Adsorbate that was adsorbed by the first adsorption device 20 moves to the evaporator/condenser 14 and is condensed therein.

The second regeneration method is described above.

Either the first regeneration method or the second regeneration method described above may be applied to regenerate the second adsorption device 22. The second adsorption device 22 can be regenerated at a lower temperature in the second regeneration method than in the first regeneration method, even when the high temperature heat source 28H is at a low temperature. In contrast to the second regeneration method, in the first regeneration method adsorption and desorption of the adsorbate are not repeated in the first adsorption device 20, and so the required overall energy for regeneration of the second adsorption device 22 is lower, and the second adsorption device 22 can be efficiently regenerated.

In the above explanation, an example configuration is given in which two adsorption devices (the first adsorption device 20 and the second adsorption device 22) are provided; however three or more adsorption devices may be disposed in series. An example configuration is considered below in which N (where N is a positive integer) adsorption devices are provided in series. The cooling L obtainable by the overall heat pump is:

Equation 1

$$L = \sum_{i=1}^{N-1} x \Delta H_i \qquad (1)$$

wherein x is a reaction amount of adsorbate in the adsorption device positioned the furthest away from the evaporator/condenser 14, and $\Delta H_i$ is reaction heat per unit mass of adsorbate in an $i^{th}$ adsorption device.

In contrast, since it is sufficient to desorb adsorbate in the $N^{th}$ adsorption device, the energy R required for regenerating the heat pump is $R = x \cdot \Delta H_N$. Further the generation efficiency E of cooling in the heat pump is $E = L/R$. In the first exemplary embodiment, when a latent heat of evaporation of the evaporator/condenser 14 is approximately 2.42 kJ/g, heat of adsorption/desorption of the first adsorption device 20 is approximately 3.2 kJ/g, and heat of adsorption/desorption of the second adsorption device 22 is approximately 3.2 kJ/g, then the calculation for cooling generation efficiency E gives approximately 1.76.

In practice, sensible heat loss occurs when adsorbate is desorbed from the first adsorption device 20. A suitable adsorbent has an adsorption amount q satisfying Equation (2): $(Ca+q \cdot Cm) \cdot (T2-T1) < q \cdot \Delta H$, wherein Ca is the specific heat of the adsorbent of the second adsorption device 22 in J/g·K, q is the amount of adsorbate desorbed by the first adsorption device 20 and adsorbed by the second adsorption device 22 in g/g, Cm is a specific heat of the adsorbate in J/g·K, and $\Delta H$ is the energy during desorption in the first adsorption device 20.

Figure 8:
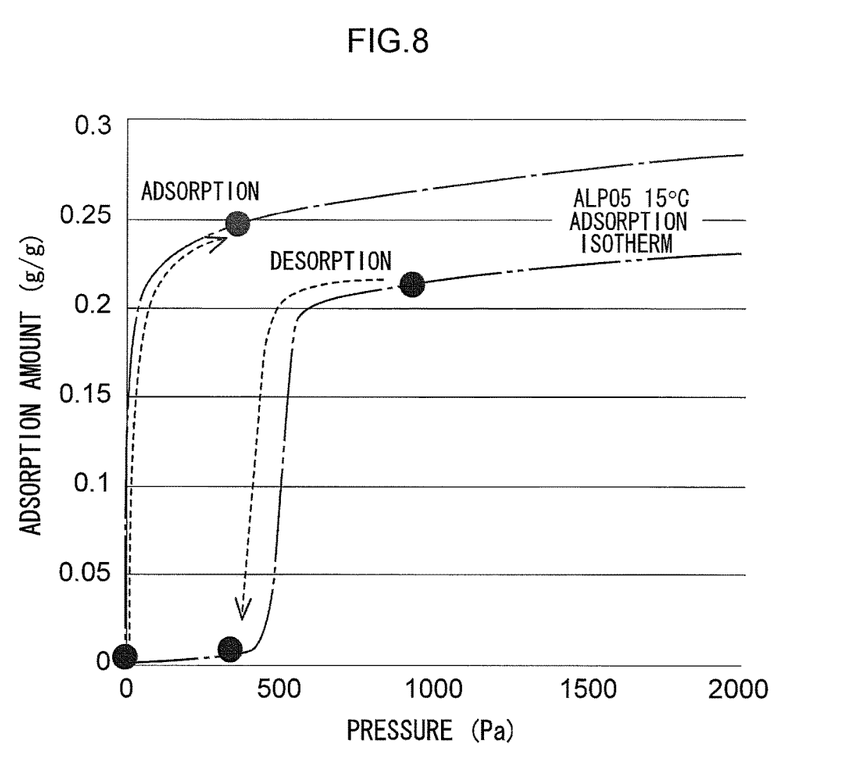
FIG. 8 is a graph illustrating an adsorption isotherm of ALPO5 at 15° C.
Figure 9:
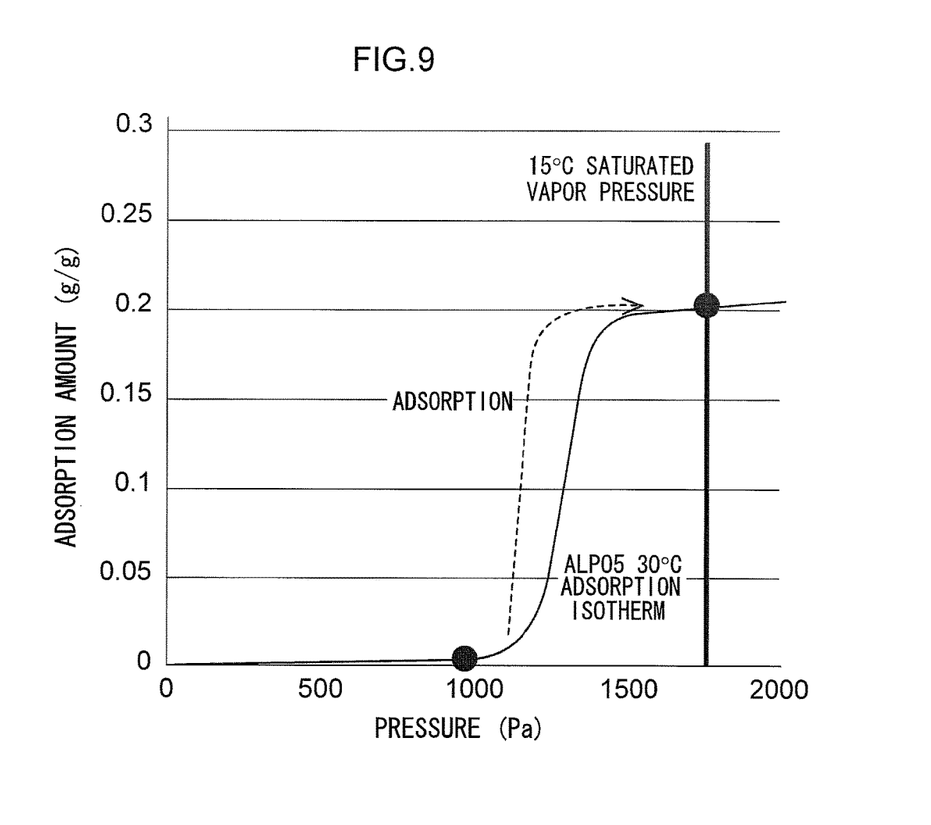
FIG. 9 is a graph illustrating an adsorption isotherm of ALPO5 at 30° C.

FIG. 8 illustrates the adsorption isotherm of AQSOA-Z05 (ALPO5) at 15° C., and FIG. 9 illustrates the adsorption isotherm of the same AQSOA-Z05 at 30° C. In FIG. 8, the single-dotted dashed line represents the adsorption isotherm when adsorbing, and the double-dotted dashed line represents the adsorption isotherm when desorbing.

In FIG. 8 and FIG. 9, q=0.2 g/g for a reduction from a pressure P1 (approximately 900 Pa) to a pressure P2 (approximately 400 Pa). Moreover, assuming that the value of the specific heat Ca of AQSOA-Z05 is 1 J/g·K, and the reaction temperature is ΔH=2.5 kJ/g. Supposing water is used as the adsorbate, then the specific heat Cm of the water =4.2 J/g·K.

As a result, the left side in the above Equation (2)=(1 J/g·K+0.2 g/g×4.2 J/g·K)×(30 K−15 K)=27.6 J/g, and the right side therein =0.2 g/g×2.5 kJ/g×1000 J/kJ=500 J/g, showing that conditions of the Equation (2) are met.

Further in the present exemplary embodiment, it is sufficient that the adsorbents of the first adsorption device 20 and the second adsorption device 22 are a combination in which adsorbate desorbed by the first adsorption device 20 can be adsorbed by the second adsorption device 22. For example, say the equilibrium pressure after an adsorbate is desorbed by the first adsorption device 20 at a temperature T1 is a first equilibrium pressure, and an equilibrium pressure after the adsorbate is adsorbed by the second adsorption device 22 at a temperature T2 is a second equilibrium pressure. In such a case a combination of adsorbents may be applied in which the second equilibrium pressure is the first equilibrium pressure or lower. Adsorbate desorbed by the first adsorption device 20 can be effectively adsorbed by the second adsorption device 22 when this condition is satisfied.

Note that a configuration of three or more adsorption devices may be applied as the above selection (combination) of adsorbents. In such cases, for two adjacent adsorption devices, the above condition are applicable, wherein the adsorption device that is relatively closer to the evaporator/condenser 14 is taken as the first adsorption device 20, and the adsorption device that is further away is taken as the second adsorption device 22. However, the structure of the heat pump 12 becomes complex when there are too many adsorption devices. Accordingly, from a perspective of generating desired cooling while suppressing the complexity of the heat pump 12 structure, the number of adsorption devices may be set at approximately two when the adsorbate is water, and approximately three when the adsorbate is ammonia.

Figure 10:
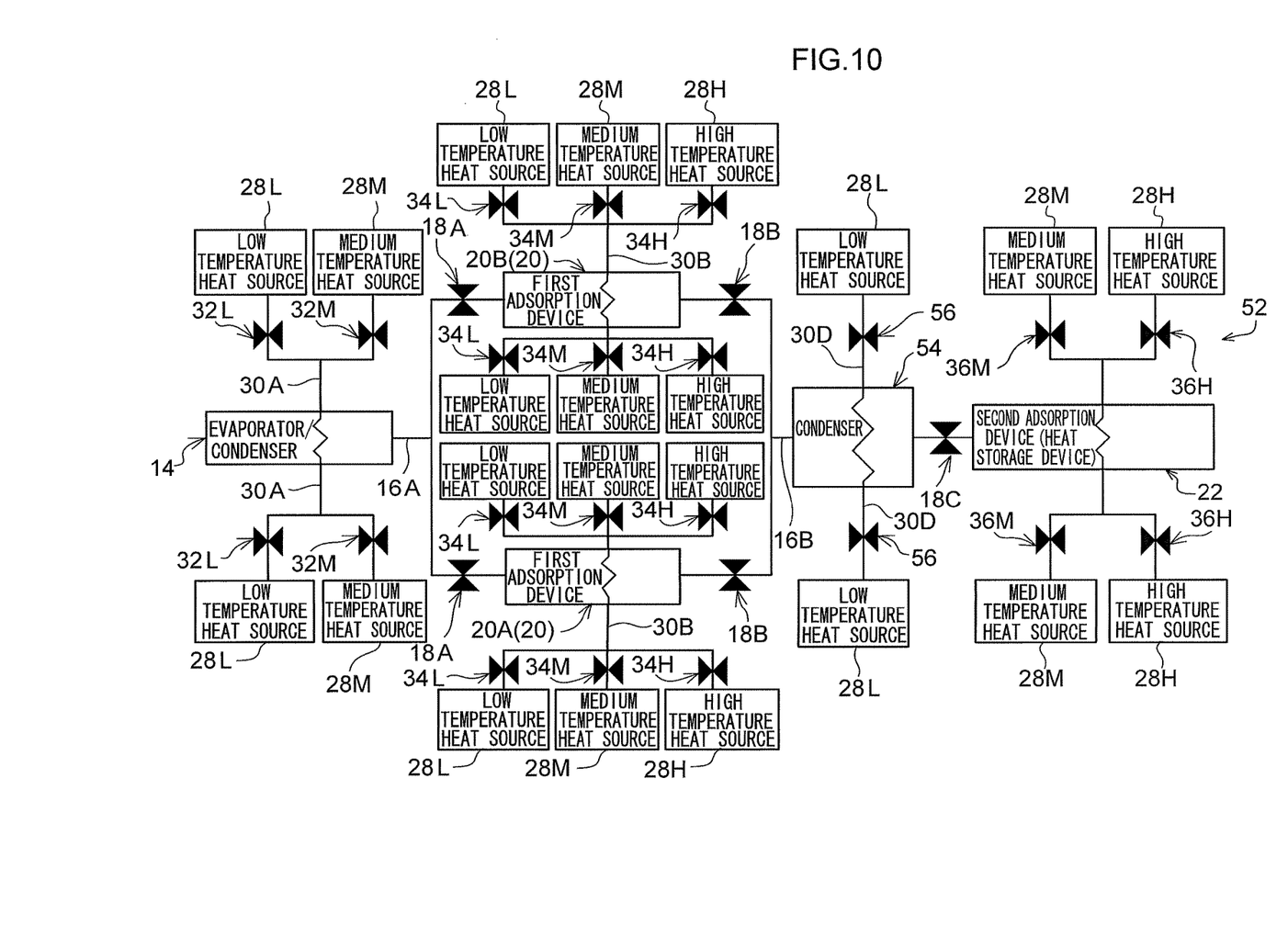
FIG. 10 is a schematic view illustrating a configuration of an adsorption heat pump system of a second exemplary embodiment of the present invention.

FIG. 10 illustrates a heat pump 52 according to a second exemplary embodiment of the present invention. In the second exemplary embodiment, configuration elements and members, etc. that are similar to the first exemplary embodiment are appended with the same reference numerals, and detailed explanation thereof is omitted.

The heat pump 52 of the second exemplary embodiment includes two first adsorption devices 20. In the below explanation, these first adsorption devices 20 are differentiated as a first adsorption device 20A and a first adsorption device 20B as required.

The first adsorption device 20A and the first adsorption device 20B are disposed in parallel to the direction of connection of the evaporator/condenser 14 to the second adsorption device 22, and to the in-series direction from the first adsorption devices 20 to the second adsorption device 22. In the second exemplary embodiment, the connecting pipe 16A branches at the first adsorption devices 20-side, and an opening/closing valve 18A is provided on each of the branched portions. The connecting pipe 16B also branches at the first adsorption devices 20-side, and an opening/closing valve 18B is provided on each of the branched portions.

Further, in the second exemplary embodiment, a condenser 54 is provided between the first adsorption devices 20 and the second adsorption device 22. The condenser 54 functions so as, for example, not to resist movement of adsorbate when the adsorbate moves from the first adsorption devices 20 to the second adsorption device 22. However, when adsorbate attempts to move from the second adsorption device 22 toward the first adsorption devices 20, the condenser 54 condenses (liquefies) part or all of the adsorbate.

The low temperature heat sources 28L are connected to the condenser 54 by connecting pipes 30D. The connecting pipes 30D are opened and closed by opening/closing valves 56. An opening/closing valve 18C is provided on the connecting pipe 16B between the condenser 54 and the second adsorption device 22.

In the heat pump 52 of the second exemplary embodiment with the above configuration, the two first adsorption devices 20A, 20B may, for example, be considered as a single unified first adsorption device 20, and may be run simultaneously.

Moreover, in the heat pump 52 of the second exemplary embodiment, it is possible to operate the two first adsorption devices 20A, 20B differently from each other. For example, an operation may be performed in the first adsorption device 20A to adsorb adsorbate that has been desorbed in the evaporator/condenser 14, and an operation may be performed in the first adsorption device 20B to desorb the adsorbate for adsorption in the second adsorption device 22 (generating cooling while the first adsorption device 20B is regenerating). Moreover, when an operation to adsorb the adsorbate from the evaporator/condenser 14 is being performed in the first adsorption device 20A, an operation may also be performed to regenerate the second adsorption device 22 and to adsorb adsorbate desorbed by the second adsorption device 22 in the first adsorption device 20B.

Further, in the heat pump 52 of the second exemplary embodiment, part or all of the adsorbate desorbed when the second adsorption device 22 is regenerated may be condensed in the condenser 54. Load on the first adsorption devices 20 when the adsorbate from the second adsorption device 22 is adsorbed by the first adsorption devices 20 is thereby reduced.

As described above, the heat pump 52 of the second exemplary embodiment is a configuration including plural first adsorption devices 20 disposed parallel to each other. When the adsorption capacity of the second adsorption device 22 is greater than the overall adsorption capacity of the first adsorption devices 20 in such a configuration, the plural first adsorption devices 20 can be made to adsorb the desorbed adsorbate alternately (or in sequence), thereby enabling continuous cooling generation to be reliably performed in the first adsorption devices 20.

The adsorption device of the present invention is not limited to a configuration in which an adsorbate is adsorbed and desorbed by an adsorbent. For example, it is sufficient that a reactor is capable of lowering the pressure of a system to a saturated vapor pressure or lower by reacting with an adsorbate at a pressure of the saturated vapor of the adsorbate or lower. Reaction used herein refers to physical adsorption, chemical adsorption, absorption, a chemical reaction, or the like.

Embodiments of the present invention are described above, but the present invention is not limited to the embodiments as will be clear to those skilled in the art.

What is claimed is:

1. An adsorption heat pump system comprising:
  an evaporator that evaporates an adsorbate;
  a plurality of first adsorption devices that adsorb the adsorbate of the evaporator and generates cooling in the evaporator, the plurality of first adsorption devices having a parallel connection that connects the plurality of first adsorption devices in parallel;

a condenser connected to the plurality of first adsorption devices via the parallel connection;

a second adsorption device that adsorbs the evaporated adsorbate from the first adsorption device through the condenser and generates cooling in the first adsorption device; and the first adsorption device and the second adsorption device each containing a different type of adsorbent, wherein:

the adsorbent of the second adsorption device desorbs the adsorbate with heat at a higher regeneration temperature than the adsorbent of the first adsorption device, and when an adsorption capacity of the second adsorption device is greater than an overall adsorption capacity of the plurality of first adsorption devices, the plurality of first adsorption devices are configured to adsorb the desorbed adsorbate alternatively or in sequence.

2. The adsorption heat pump system of claim 1, wherein:
a combination of adsorbents of the first adsorption device and the second adsorption device is a combination such that, with respect to a first equilibrium pressure after the adsorbate has been desorbed by the first adsorption device, a second equilibrium pressure after the desorbed adsorbate has been absorbed by the second adsorption device is the first equilibrium pressure or lower.

3. The adsorption heat pump system of claim 1, wherein an adsorption capacity of the second adsorption device is greater than an adsorption capacity of the first adsorption device.

4. The adsorption heat pump system of claim 1, wherein the adsorbate is water or ammonia.

5. The adsorption heat pump system of claim 1, wherein:
the evaporator also operates as a condenser that condenses the introduced gaseous adsorbate; and the adsorption heat pump system further includes a bypass pipe that bypasses a plurality of the first adsorption devices and connects the evaporator and the second adsorption device together.

6. The adsorption heat pump system of claim 1, further comprising a plurality of the first adsorption devices that are disposed in a direction parallel to a connection direction of the evaporator and the second adsorption device.

7. The adsorption heat pump system of claim 1, further comprising a condenser that is provided between the first adsorption device(s) and the second adsorption device and that condenses the adsorbate.

8. A cooling generation method, using: (i) an evaporator that evaporates an adsorbate; (ii) a plurality of first adsorption devices that adsorb the adsorbate of the evaporator, the plurality of first adsorption devices having a parallel connection that connects the plurality of first adsorption devices in parallel; (ii) a condenser connected to the plurality of first adsorption devices via the parallel connection; and (iii) a second adsorption device that adsorbs the adsorbate adsorbed by the first adsorption device, the cooling generation method comprising:

adsorbing the adsorbate of the evaporator by the first adsorption device and cooling the evaporator, and adsorbing the evaporated adsorbate of the first adsorption device by the second adsorption device through the condenser and cooling the first adsorption device, wherein:

the first adsorption device and the second adsorption device each contain a different type of adsorbent, and the adsorbent of the second adsorption device desorbs the adsorbate with heat at a higher regeneration temperature than the adsorbent of the first adsorption device, and when an adsorption capacity of the second adsorption device is greater than an overall adsorption capacity of the plurality of first adsorption devices, the plurality of first adsorption devices are configured to adsorb the desorbed adsorbate alternatively or in sequence.

9. The cooling generation method of claim 8, wherein:
the evaporator also operates as a condenser that condenses the introduced gaseous adsorbate; and the adsorbate of the second adsorption device is: (i) adsorbed by the first adsorption device, or (ii) condensed in the evaporator, during regeneration of the second adsorption device.

* * * * *